(12) United States Patent
Janakiraman et al.

(10) Patent No.: US 11,861,312 B2
(45) Date of Patent: Jan. 2, 2024

(54) CONTENT EVALUATION BASED ON MACHINE LEARNING AND ENGAGEMENT METRICS

(71) Applicant: International Business Machines Corporation, Armonk, NY (US)

(72) Inventors: Janani Janakiraman, Austin, TX (US); Su Liu, Austin, TX (US); Nadiya Kochura, Bolton, MA (US); Fang Lu, Billerica, MA (US)

(73) Assignee: International Business Machines Corporation, Armonk, NY (US)

(*) Notice: Subject to any disclaimer, the term of this patent is extended or adjusted under 35 U.S.C. 154(b) by 887 days.

(21) Appl. No.: 16/566,529

(22) Filed: Sep. 10, 2019

(65) Prior Publication Data

US 2021/0073673 A1    Mar. 11, 2021

(51) Int. Cl.
| | |
|---|---|
| *G06F 40/30* | (2020.01) |
| *G06N 20/00* | (2019.01) |
| *G06T 7/00* | (2017.01) |
| *G06F 40/284* | (2020.01) |
| *G06F 18/23* | (2023.01) |
| *G06F 18/21* | (2023.01) |
| *G06V 30/40* | (2022.01) |
| *G06V 30/19* | (2022.01) |
| *G06V 30/262* | (2022.01) |
| *G06V 10/762* | (2022.01) |

(52) U.S. Cl.
CPC ............ *G06F 40/30* (2020.01); *G06F 18/217* (2023.01); *G06F 18/23* (2023.01); *G06F 40/284* (2020.01); *G06N 20/00* (2019.01); *G06T 7/97* (2017.01); *G06V 10/762* (2022.01); *G06V 30/1916* (2022.01); *G06V 30/268* (2022.01); *G06V 30/274* (2022.01); *G06V 30/40* (2022.01)

(58) Field of Classification Search
CPC ........ G06F 40/30; G06F 40/284; G06F 18/23; G06K 9/6218
See application file for complete search history.

(56) References Cited

U.S. PATENT DOCUMENTS

| | | |
|---|---|---|
| 9,451,303 B2 | 9/2016 | Kothuri et al. |
| 9,881,512 B2 | 1/2018 | Jeyanandarajan |

(Continued)

FOREIGN PATENT DOCUMENTS

| | | |
|---|---|---|
| WO | 2008030493 A2 | 3/2008 |
| WO | 2017152215 A1 | 9/2017 |

OTHER PUBLICATIONS

Dooley, Roger, "Stories Synchonize Brains," [Accessed online Jul. 1, 2019] https://www.neurosciencemarketing.com/blog/articles/stories-synchronize-brains.htm, 4 pages.

(Continued)

*Primary Examiner* — Scott T Baderman
*Assistant Examiner* — Seung Woon Jung
(74) *Attorney, Agent, or Firm* — Patterson + Sheridan, LLP

(57) ABSTRACT

Techniques for machine learning analysis are provided. A machine learning (ML) model is trained to identify appropriate documents based on lexical knowledge of target groups. A lexical knowledge of a set of users is determined. Additionally, a first document of a plurality of documents is selected by processing the determined level of lexical knowledge using the ML model. The first document is presented to the set of users. A level of engagement of the set of users is then determined. Upon determining that the level of engagement is below a predefined threshold, a second document of the plurality of documents is selected using the ML model.

20 Claims, 6 Drawing Sheets

(56) References Cited

U.S. PATENT DOCUMENTS

| | | | |
|---|---|---|---|
| 10,068,490 | B2 | 9/2018 | Hibbs et al. |
| 11,153,655 | B1* | 10/2021 | Germano ............. H04N 21/252 |
| 11,373,446 | B1* | 6/2022 | Beisel ..................... G10L 25/63 |
| 2013/0205314 | A1 | 8/2013 | Ramaswamy et al. |
| 2015/0099255 | A1 | 4/2015 | Aslan et al. |
| 2017/0221472 | A1* | 8/2017 | Sharifi ................... G10L 13/00 |
| 2018/0268309 | A1* | 9/2018 | Childress ............. G06F 40/237 |
| 2020/0126533 | A1* | 4/2020 | Doyle ................ G10L 15/1815 |

OTHER PUBLICATIONS

"A Beautiful Sales Mind," [Accessed online Jul. 1, 2019] https://www.neurosciencemarketing.com/blog/articles/stories-synchronize-brains.htm, 4 pages.

"Science of the Heart," [Accessed online Jul. 1, 2019] https://www.heartmath.org/research/science-of-the-heart/energetic-communication/ 10 pages.

"IBM AbilityLab Content Clarifier," [Accessed Jul. 2, 2019] https://www.ibm.com/able/content-clarifier.html.

"Audience Response Software," [Accessed Jul. 2, 2019] https://www.capterra.com/audience-response-software/.

"Exploring Audience Response in Performing Arts with a Brain-Adaptive Digital Performance System", (Abstract Only) [Accessed Jul. 2, 2019] https://dl.acm.org/citation.cfm?doid=3166060.3009974.

Miles, Karoline, "6 technologies to increase audience engagement in events" [Accessed Jul. 2, 2019] https://taggbox.com/blog/6-technologies-increase-audience-engagement-events/.

Moseman, Andrew, "Study: The Brains of Storytellers and Their Listeners Actually Sync Up," [Accessed Jul. 2, 2019] http://blogs.discovermagazine.com/80beats/2010/07/27/study-the-brains-of-storytellers-and-their-listeners-actually-sync-up/#.XRtUseRYaUm.

Corley, et al., "Measuring the Semantic Similarity of Texts," [Accessed Jul. 2, 2019] http://www.aclweb.org/anthology/W05-1203.

\* cited by examiner

CONTENT EVALUATION BASED ON MACHINE LEARNING AND ENGAGEMENT METRICS

BACKGROUND

The present disclosure relates to machine learning, and more specifically, to using machine learning to evaluate content complexity and lexical understanding.

User engagement and comprehension of provided information can be significantly impacted by the complexity of the content. Efforts can be made to manually tailor presentations to the audience, such as by giving a simplified speech to young children and reserving the complex discussions for graduate students. However, these customizations are manual and time-consuming. Further, the modifications for different audiences are inherently subjective and depend a great deal on the personal preferences, biases, and assumptions of the presenter as well as the target audience.

SUMMARY

According to one embodiment of the present disclosure, a method is provided. The method includes training a machine learning (ML) model to identify appropriate documents based on lexical knowledge of target groups, and determining a lexical knowledge of a set of users. The method further includes selecting a first document of a plurality of documents by processing the determined level of lexical knowledge using the ML model, and facilitating presentation of the first document to the set of users. Additionally, the method includes determining a level of engagement of the set of users. Upon determining that the level of engagement is below a predefined threshold, the method includes selecting a second document of the plurality of documents using the ML model.

According to a second embodiment of the present disclosure, a computer-readable storage medium is provided. The computer-readable storage medium contains computer program code that, when executed by operation of one or more computer processors, performs an operation. The operation includes training a machine learning (ML) model to identify appropriate documents based on lexical knowledge of target groups, and determining a lexical knowledge of a set of users. The operation further includes selecting a first document of a plurality of documents by processing the determined level of lexical knowledge using the ML model, and facilitating presentation of the first document to the set of users. Additionally, the operation includes determining a level of engagement of the set of users. Upon determining that the level of engagement is below a predefined threshold, the operation includes selecting a second document of the plurality of documents using the ML model.

According to a third embodiment of the present disclosure, a system is provided. The system includes one or more computer processors, and a memory containing a program which, when executed by the one or more computer processors, performs an operation. The operation includes training a machine learning (ML) model to identify appropriate documents based on lexical knowledge of target groups, and determining a lexical knowledge of a set of users. The operation further includes selecting a first document of a plurality of documents by processing the determined level of lexical knowledge using the ML model, and facilitating presentation of the first document to the set of users. Additionally, the operation includes determining a level of engagement of the set of users. Upon determining that the level of engagement is below a predefined threshold, the operation includes selecting a second document of the plurality of documents using the ML model.

DETAILED DESCRIPTION

Embodiments of the present disclosure provide techniques for dynamically evaluating the lexical knowledge and understanding of users in order to tailor materials to an appropriate level of complexity. Additionally, embodiments disclosed herein can be used to monitor and evaluate user engagement in order to dynamically alter the complexity of the presented content, which ensures that users remain engaged and attentive, and improves retention and comprehension of the materials. In some embodiments, documents or other content are analyzed and evaluated in order to determine semantic similarity between each documents, as well as lexical complexity of each document. In an embodiment, one or more machine learning (ML) models can thereafter be trained based in part on the complexity of each document or set of documents, in order to recommend or select an appropriate complexity to a given audience of users. Once the model is trained, in some embodiments, the engagement of the audience is actively monitored and provided to the model(s) in order to dynamically tailor the content of the presentation and maximize engagement.

Figure 1A:
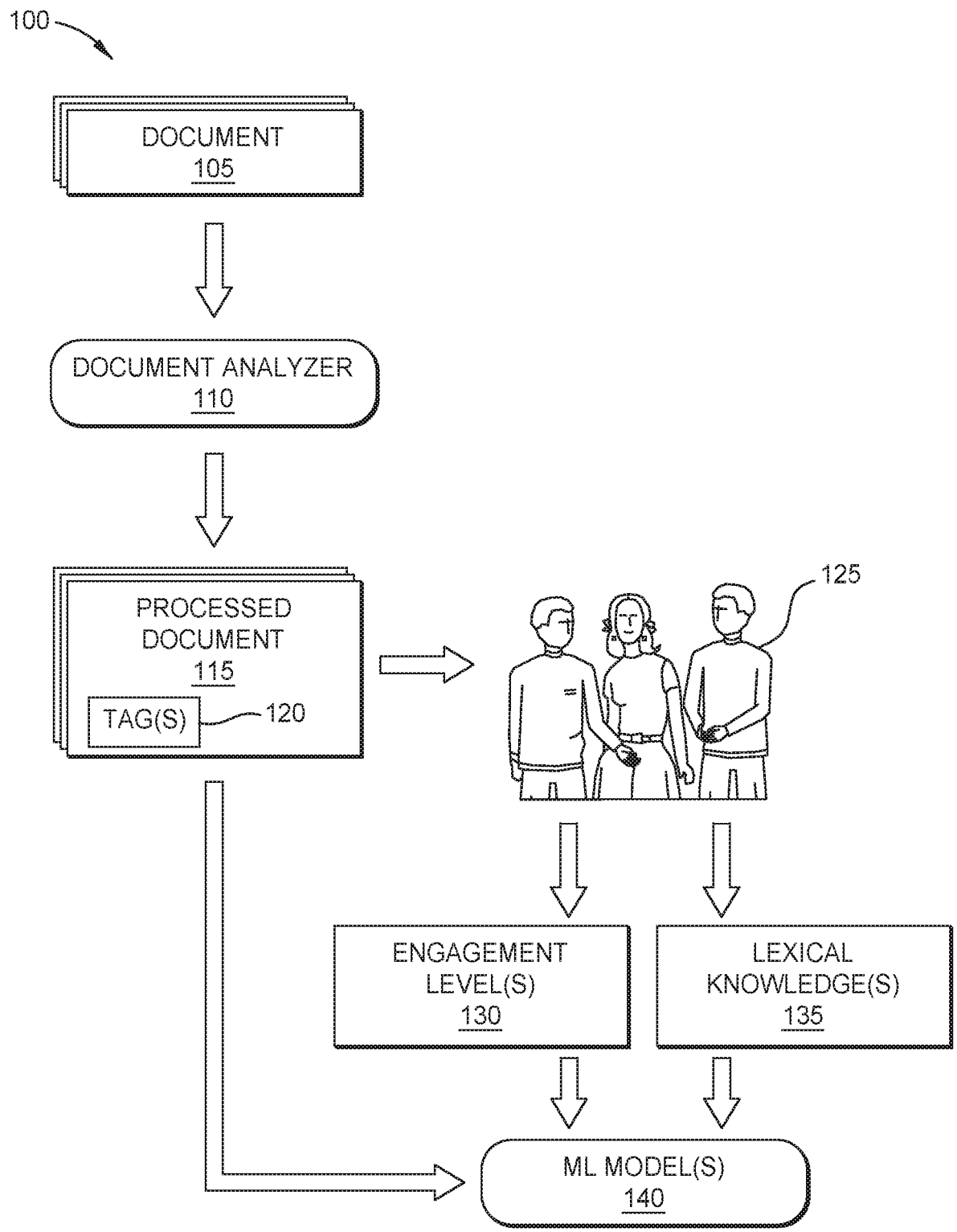
FIGS. 1A and 1B illustrate workflows for training and using a model to correlate user engagement and lexical understanding, according to one embodiment disclosed herein.

FIG. 1A illustrates a workflow 100 for training a model to correlate user engagement and lexical understanding, according to one embodiment disclosed herein. In the illustrated embodiment, a set of Documents 105 are provided as input to a Document Analyzer 110. In embodiments, the Documents 105 can include any information content, such as presentation materials (e.g., sets of slides), handouts, papers, books, multimedia (e.g., videos and/or audio), and the like. The Documents 105 may relate to any number of domains or topics, and may be any level of complexity. In the illustrated embodiment, the Document Analyzer 110 receives the Documents 105 and processes them to generate Processed Documents 115 which are each associated with one or more Tags 120. In one embodiment, the Document Analyzer 110 uses one or more ML models and/or natural language processing (NLP) techniques to cluster the Documents 105 based on semantic similarity, and assigns Tags 120 reflecting these clusters (e.g., to group semantically-similar documents).

In some embodiments, the Document Analyzer 110 further determines statistical data about each Document 105 in order to determine a lexical complexity of the Document 105. In various embodiments, the statistical data can include the frequency with which various tokens (e.g., words, phrases, and/or concepts) appear in the Document 105. In one such embodiment, one or more of these tokens are associated with predefined complexity scores, and a complexity of the Document 105 can be determined based on the frequencies of each token. For example, in such an embodiment, some words or phrases may be associated with high complexity while other words and phrases are associated with relatively low complexity. In such an embodiment, a Document 105 having a high frequency of the high complexity tokens (as compared to low complexity tokens) will be assigned a higher complexity score, relative to a document with a relatively lower frequency of high complexity tokens.

In some embodiments, the Document Analyzer 110 first evaluates the Documents 105 to determine frequencies of various tokens with respect to the entire corpus of Documents 105 and/or with respect to each cluster. The Document Analyzer 110 can then determine the frequency of each such token with respect to a given Document 105 in order to determine a complexity of the Document 105. In one such embodiment, the Document Analyzer 110 identifies common tokens that are found with a first threshold frequency in the Documents 105 (or within a given cluster), less common tokens that are found below the first threshold but above a second threshold, and rare tokens that are found below the second threshold. If a first Document 105 includes a relatively high number or frequency of rare tokens as compared to a second Document 105, the Document Analyzer 110 can determine that the first Document 105 is complex, as compared to the second Document 105.

In one embodiment, the Document Analyzer 110 uses predefined threshold frequencies of common, less common, and rare tokens in order to determine lexical complexity of each Document 105. For example, in an embodiment, a Document 105 with a frequency or count of rare words exceeding a first threshold may be classified as "advanced," while documents with a frequency or count of rare tokens between the first threshold and a second threshold are classified as "intermediate" and documents with a frequency or count of rare tokens are classified as "basic." Any thresholds may be utilized with respect to each class of token (e.g., rare, intermediate, and common) in order to classify the Documents 105. In an embodiment, the Tags 120 generated by the Document Analyzer 110 include this lexical complexity classification.

As illustrated, these Processed Documents 115 are provided to or otherwise presented to a test set of Users 125 in order to monitor their Engagement Level(s) 130. In one embodiment, a presenter uses some or all of the Processed Documents 115 to create one or more presentations. In some embodiments, some or all of the Processed Documents 115 are provided directly to the Users 125. In an embodiment, multiple separate presentations are prepared based on the Processed Documents 115. In such an embodiment, each presentation of the material includes a subset of the Processed Documents 115 corresponding to a given cluster and complexity. For example, a first presentation may correspond to Processed Documents 115 with a first cluster tag (e.g., belonging to a "healthcare" domain) and a first lexical complexity tag (e.g., a "beginner" complexity).

In some embodiments, these separate presentations/sets of documents are each provided to a separate set of Users 125.

In other embodiments, some or all of the sets of Users 125 may receive multiple presentations. In the illustrated workflow 100, for each presentation, the Engagement Level(s) 130 of the Users 125 are monitored (on a per-user basis and/or aggregated across the users) and used to train one or more ML Models 140. In one embodiment, for each set of Users 125, the ML Models are also trained based on the Lexical Knowledge 135 of the Users 125 (on a per-user basis and/or as an aggregated or average value). In one embodiment, the Lexical Knowledge 135 indicates the user comfort and expertise, and can be based on a variety of factors including the native language of the user, other language(s) the user speaks or understands, the education level of the user, and the like. In some embodiments, the Lexical Knowledge 135 further indicates the level of the user's domain and subject knowledge, such as terms, notations, and formulas they are familiar with, and the like.

In embodiments, the Engagement Levels 130 can be determined in any number of ways. For example, in one embodiment, one or more of the Users 125 are fitted with electroencephalogram (EEG) and/or electrocardiogram (ECG) equipment in order to monitor the brain and/or heart activity of the user. In some embodiments, one or more audio capture devices (e.g., microphones) are used to monitor audio from the Users 125 in order to determine the Engagement Levels 130. For example, the system may monitor the frequency of questions or interruptions from the Users 125. In one embodiment, the system uses one or more NLP algorithms to analyze the content of the user remarks, in order to determine their complexity, the user's understanding, and the like. Further, in some embodiments, the system monitors for sounds indicating poor engagement, such as fidgeting, yawning, murmuring within the set of Users 125, and the like.

Additionally, in one embodiment, the system utilizes one or more video capture devices (e.g., cameras) capture images and/or video of the users for analysis. In one such embodiment, the system can apply image recognition algorithms to determine the Engagement Level 130 of the users. For example, the system may recognize indications of high engagement (e.g., if the users appear to be attentive and facing the presenter) and low engagement (e.g., if the users are fidgeting, looking around the room, yawning, napping, and the like). In at least one embodiment, each User 125 can additionally indicate (e.g., via a mobile device) how engaged they feel at any given time. In embodiments, the system can utilize any combination of methodologies, as well as other techniques not discussed in detail here, to determine the Engagement Levels 130.

In the illustrated embodiment, the ML Models 140 are also provided with the Processed Documents 115 and corresponding Tags 120. In one embodiment, each ML Model 140 represents a supervised machine learning model trained to receive an indication of Lexical Knowledge 135 and/or Engagement Levels 130 as input, and select one or more Processed Documents 115 as output. In an embodiment, during training, the system can determine, for each User with a given Lexical Knowledge 135, an Engagement Level 130 when presented with Processed Documents 115 associated with a given lexical complexity (as indicated in the corresponding Tags 120). In some embodiments, the system further prompts or facilitates presentation of Processed Documents 115 with a different lexical complexity in order to determine how the Engagement Levels 130 change.

Based on these factors, in one embodiment, the system trains one or more ML Models 140 to act as a classifier by receiving an indication of the Lexical Knowledge 135 of the target user(s) and outputting a selection of the appropriate lexical complexity (e.g., a set of documents). In embodiments, the training process continues until no Processed Documents 115 remain, no additional test Users 125 are available, the ML Models are sufficiently trained, and the like. In one embodiment, a separate ML Model 140 is trained for each cluster of documents (e.g., for each domain or topic). In another embodiment, a single ML Model 140 can be trained across a number of clusters and/or domains.

Figure 1B:
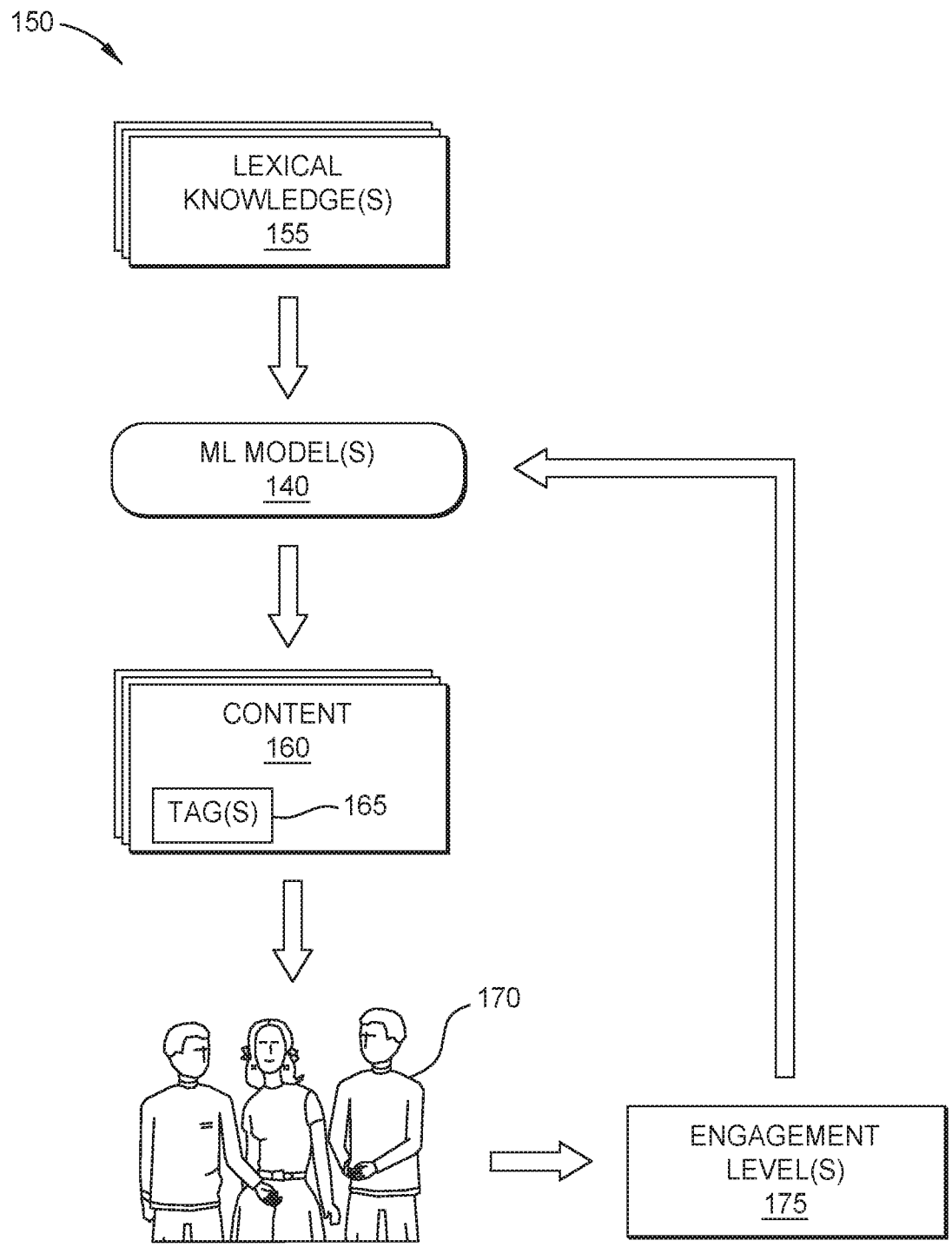

FIG. 1B illustrates a workflow 150 for using a model to correlate user engagement and lexical understanding, according to one embodiment disclosed herein. In the illustrated embodiment, the ML Model(s) 140 have been trained and are deployed for use. As illustrated, the workflow 150 begins when an indication of the Lexical Knowledge 155 of a target set of Users 170 is provided to the ML Model(s) 140. In one embodiment, the Lexical Knowledge 155 of the Users 170 is retrieved or determined based on one or more profiles associated with the Users 170. For example, in one such embodiment, the system determines a level of Lexical Knowledge 155 of each User 170 in the target group based on factors such as the user's native language, other languages the user speaks, education level, and the like. In some embodiments, the target Users 170 are indicated by a user (e.g., a presenter), and the system identifies the corresponding Lexical Knowledge 155.

In some embodiments, the ML Model 140 processes each Lexical Knowledge 155 (e.g., the knowledge of each user). In another embodiment, the Lexical Knowledge 155 is aggregated to determine an overall knowledge of the group. For example, the system can average the knowledge of each user, determine the median (e.g., without outliers), and the like. Based on the Lexical Knowledge 155, the ML Models 140 identify/select Content 160 using the Tags 165. In one embodiment, each item of the Content 160 corresponds to a Processed Document 115. In an embodiment, the ML Model 140 outputs a recommended level of lexical complexity, and Content 160 with a corresponding complexity (indicated by the Tags 165) is retrieved. In embodiments, the Content 160 is further selected based on the topic, domain, and/or cluster to which it belongs (e.g., based on the desired topic of the presentation).

As illustrated, the system facilitates presentation of the selected Content 160 to the Users 170 (e.g., by providing it to a presenting user, preparing handouts, and the like). While the presentation is ongoing, in some embodiments, the Engagement Levels 175 of one or more of the Users 170 is determined. In embodiments, the Engagement Levels 175 of the Users 170 can be monitored in any number of ways. For example, in some embodiments, the system collects biological data such as brain activity, heart rate, sweat detection, pupil dilatation, and the like in order to determine the Engagement Levels 175.

In at least one embodiment, the system utilizes one or more image and/or audio capture devices to capture image data and/or audio data, and processes this data to determine engagement. For example, in one such embodiment, the system can apply image and/or motion recognition to determine whether the Users 170 appear engaged (e.g., looking at the presenter, sitting still, etc.) or disengaged (e.g., looking around the room aimlessly, shuffling or moving in their seats, sitting with their eyes closed and/or head down, etc.). Similarly, in one such embodiment, the audio can be parsed to determine whether the users are asking questions or commenting on the presentation. Additionally, in some embodiments, the Users 170 can explicitly provide their engagement levels (e.g., via a score or rating).

In the illustrated embodiment, the Engagement Levels 175 are provided to the ML Model(s) 140 to select additional or alternative Content 160. In one embodiment, the system does so upon determining that the Engagement Levels 175 are below a predefined threshold. In one embodiment, the system aggregates the Engagement Levels 175 (e.g., by determining a median or mean engagement) prior to determining whether it satisfies the threshold. If the Engagement Levels 175 satisfy the defined threshold(s), in one embodiment, the system takes no action and allows the presentation to proceed. In one embodiment, if the Engagement Levels 175 are below the required threshold, the system provides updated Content 160 to the presenter and/or Users 170.

In some embodiments, the Content 160 includes documents regarding a given topic, with varying levels of complexity. For example, in one embodiment, a set of documents (e.g., corresponding to a presentation) can be defined at various levels of complexity (e.g., at a school-aged level, at a graduate level, and at an expert level). In one such embodiment, the system can select between these levels using the ML Models 140.

Figure 2:
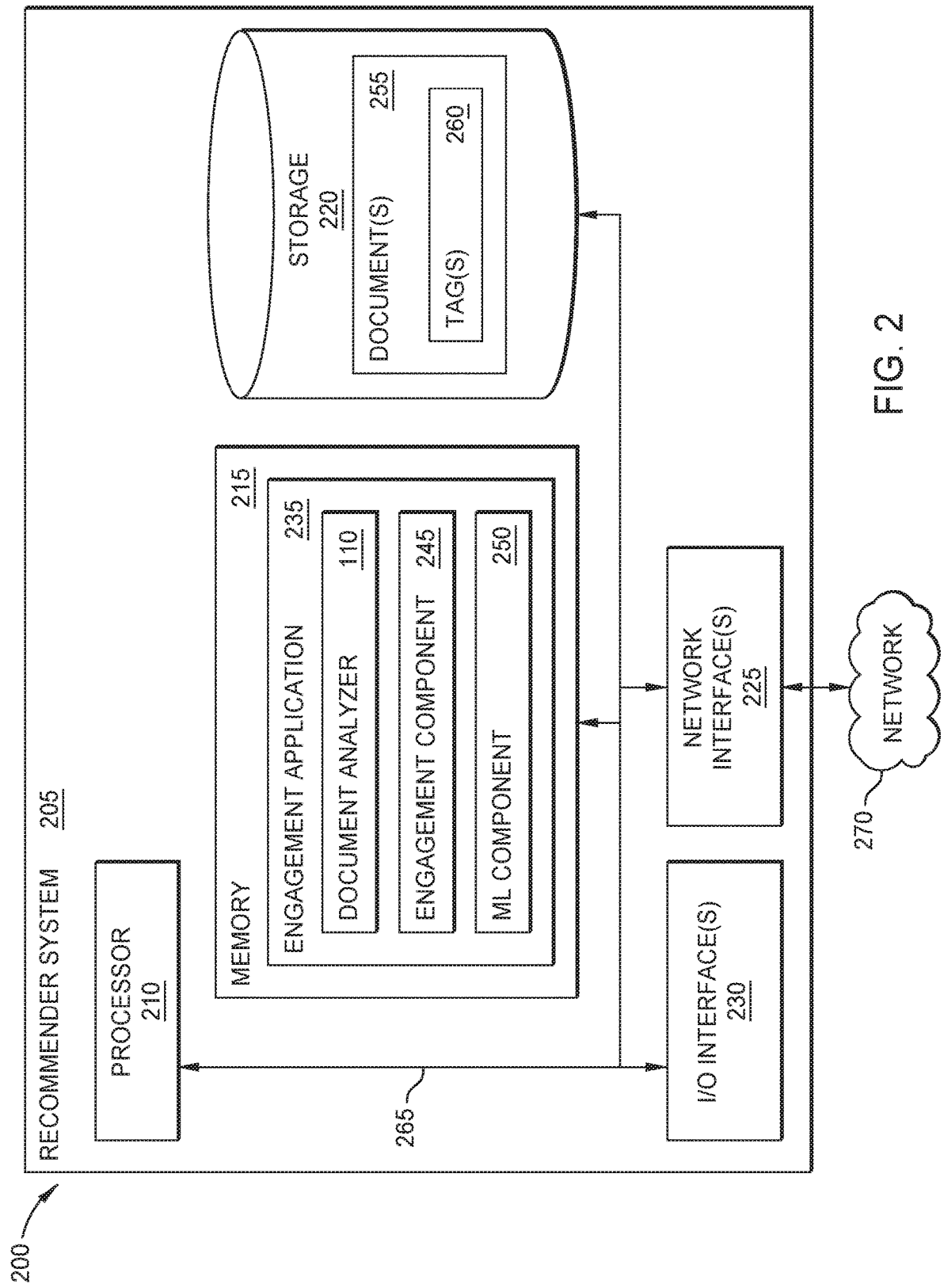
FIG. 2 is a block diagram illustrating a recommender system configured to evaluate and recommend content using machine learning, according to one embodiment disclosed herein.

FIG. 2 is a block diagram illustrating a Recommender System 205 configured to evaluate and recommend content using machine learning, according to one embodiment disclosed herein. Although depicted as a physical device, in embodiments, the Recommender System 205 may be implemented using virtual device(s), and/or across a number of devices (e.g., in a cloud environment). As illustrated, the Recommender System 205 a Processor 210, Memory 215, Storage 220, a Network Interface 225, and one or more I/O Interfaces 230. In the illustrated embodiment, the Processor 210 retrieves and executes programming instructions stored in Memory 215, as well as stores and retrieves application data residing in Storage 220. The Processor 210 is generally representative of a single CPU and/or GPU, multiple CPUs and/or GPUs, a single CPU and/or GPU having multiple processing cores, and the like. The Memory 215 is generally included to be representative of a random access memory. Storage 220 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 230. Similarly, via the Network Interface 225, the Recommender System 205 can be communicatively coupled with one or more other devices and components (e.g., via the Network 270, which may include the Internet, local network(s), and the like). As illustrated, the Processor 210, Memory 215, Storage 220, Network Interface(s) 225, and I/O Interface(s) 230 are communicatively coupled by one or more Buses 265.

In the illustrated embodiment, the Storage 220 includes a set of Documents 255, each with one or more Tags 260. In some embodiments, the Documents 255 are used to train one or more ML models used to select content for users, based on their lexical understanding and/or current engagement. Similarly, in one embodiment, the trained ML models select from among the Documents 255 based on the lexical understanding and/or engagement of the target user(s). In an embodiment, the Tags 260 can indicate a cluster to which the corresponding Document 255 belongs (e.g., based on semantic similarity with other Documents 255), a domain or topic of the Document 255, a type of the Document 255, a lexical complexity of the Document 255, and the like.

As illustrated, the Memory 215 includes an Engagement Application 235. Although depicted as software residing in Memory 215, in embodiments, the functionality of the Engagement Application 235 can be implemented using hardware, software, or a combination of hardware and software. In the illustrated embodiment, the Engagement Application 235 includes a Document Analyzer 110, an Engagement Component 245, and an ML Component 250. Although depicted as discrete components for conceptual clarity, in embodiments, the operations of the Document Analyzer 110, Engagement Component 245, and ML Component 250 can be combined or distributed across any number of components.

In an embodiment, the Document Analyzer 110 generally receives and analyzes Documents 255, as discussed above. For example, the Document Analyzer 110 may cluster the Documents 255 based on semantic similarity, and/or evaluate each Document 255 to determine its lexical complexity. In one embodiment, as discussed above, the Document Analyzer 110 classifies the lexical complexity of a given Document 255 based on the frequency of tokens (e.g., words, phrases, concepts, and the like) as compared to the overall corpus of Documents 255 (or as compared to Documents 255 within the same semantic cluster). For example, in one such embodiment, the Document Analyzer 110 can identify and classify as "rare" any words that appear in less than a predefined percentage of the Documents 255. In another embodiment, the Document Analyzer 110 classifies a word as "rare" if it appear below a predefined frequency in the collection of Documents 255, such as by determining the frequency of the word for each document (or for the overall corpus), where the frequency of an index word is the ratio of the number of times the index word appears, as compared to the number of other words in the document(s).

In some embodiments, the Document Analyzer 110 similarly classifies "less common" words and/or "common" words using other thresholds (e.g., using progressively higher thresholds of frequency). In one embodiment, the Documents 255 are then classified into levels or categories of lexical complexity (e.g., basic, intermediate, and advanced) based on the relative frequency of the defined "rare," "common," and/or "less common" words in each. For example, a Document 255 with a large proportion of "rare" words may be classified as "advanced," while a Document 255 with a lower proportion of "rare" words is classified as "intermediate," and a Document 255 with an even lower proportion of "rare" words is classified as "basic." The lexical complexity of each, as well as the semantic cluster, can then be incorporated in the Tags 260 associated with each Document 255.

In one embodiment, the Engagement Component 245 monitors the engagement of users while receiving, reviewing, or otherwise interacting with the Documents 255 (e.g., while a first user is giving a presentation involving the Documents 255). In one embodiment, during a training phase, this engagement data is provided to the ML Component 250 for training and/or refining the models. During deployment, in an embodiment, the engagement data is fed into the ML models to determine whether to select a different set of one or more Documents 255 for a given set of user(s). In embodiments, the Engagement Component 245 can use a number of means to determine the engagement of the user. For example, in various embodiments, the Engagement Component 245 may utilize EEG, EKG, heart-rate monitoring, and other biological data monitoring. Similarly, in some embodiments, the Engagement Component 245 uses image and/or audio analysis (e.g., to monitor whether the users are paying attention).

In an embodiment, during training, the ML Component 250 receives the determined engagement level(s) and trains or refines one or more ML models based on the engagement of the users. In one embodiment, the training is further based on the lexical knowledge of the users. For example, the ML Component 250 may train a ML model to receive an indication of the lexical knowledge of the user(s) and/or the current engagement of the users, and to output an indication of the recommended lexical complexity of the presentation (e.g., of the Documents 255 that should be used). Once the models are so trained, they can be used in real-time to analyze the lexical knowledge and/or engagement of an audience of users, in order to select appropriate Documents 255 for the users.

Figure 3:
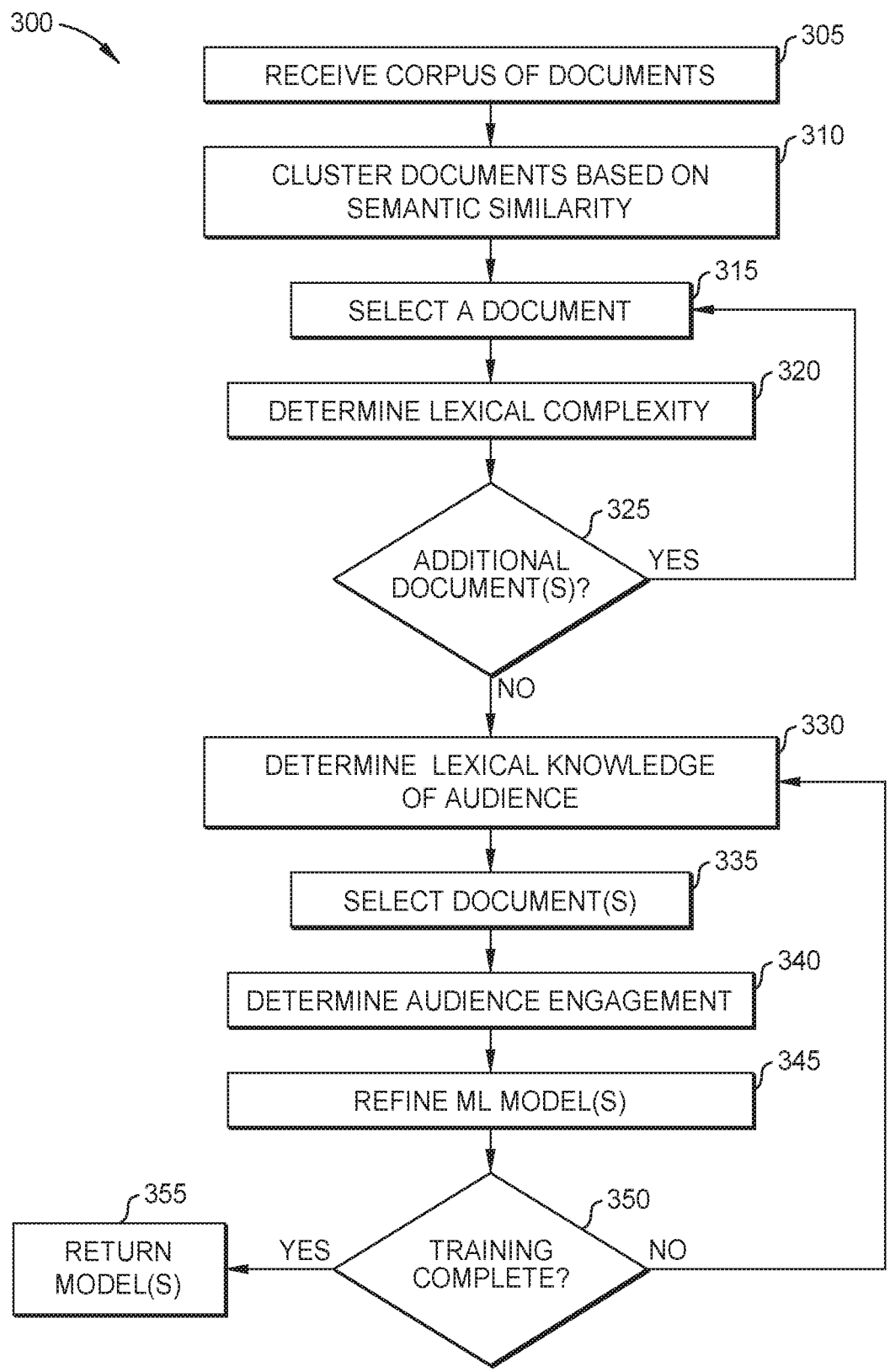
FIG. 3 is a flow diagram illustrating a method for training machine learning models based on lexical complexity and knowledge, according to one embodiment disclosed herein.

FIG. 3 is a flow diagram illustrating a method 300 for training machine learning models based on lexical complexity and knowledge, according to one embodiment disclosed herein. The method 300 begins at block 305, where an Engagement Application 235 receives a corpus of documents for ingestion. In embodiments, these documents can pertain to any number of topics or domains, and be of any complexity. In some embodiments, the Engagement Application 235 receives a set of documents and generates, for each document, one or more corresponding "simplified" document(s) (e.g., by substituting rare or uncommon words for more common synonyms, by using machine learning to simplify sentences and/or shorten them, and the like).

The method 300 continues to block 310, where the Engagement Application 235 clusters the received documents based on their semantic similarity. In one embodiment, to do so, the Engagement Application 235 generates semantic similarity scores between each pair of documents in the received corpus, and generates one or more clusters of documents based on these similarity scores. In this way, the Engagement Application 235 can suggest other documents that are semantically similar to a given document (but which may have a different lexical complexity). At block 315, the Engagement Application 235 selects one of the received documents. The method 300 then proceeds to block 320, where the Engagement Application 235 determines the lexical complexity of the received document.

In one embodiment, as discussed above, determining the lexical complexity of the selected document includes determining the number, frequency, and/or ratio of "rare" words or tokens, "uncommon" words or tokens, and/or "common" words or tokens, as compared to the overall corpus (or as compared to the cluster to which the selected document belongs). In an embodiment, these values can then be compared to a set of thresholds to classify the documents into categories of lexical complexity. For example, an "expert" category may include documents where a defined minimum number of "rare" words are found in the document, each with a minimum frequency.

At block 325, the Engagement Application 235 determines whether there is at least one additional document to be analyzed. If so, the method 300 returns to block 315. Otherwise, the method 300 proceeds to block 330, where the Engagement Application 235 determines the lexical knowledge of the test audience. In one embodiment, the Engagement Application 235 determines the audience's lexical knowledge based on profile(s) of the users (e.g., specifying native language, education level, and the like). In another embodiment, the Engagement Application 235 determines the audience's lexical knowledge based on responses to surveys, or any other data.

At block 335, the Engagement Application 235 selects one or more documents to be provided and/or presented to the audience. In one embodiment, the Engagement Application 235 receives an indication of the desired topic/domain, and selects documents randomly from within the domain (e.g., without regards to the lexical complexity of the document). In another embodiment, the Engagement Application 235 is provided with an indication of an index or seed document, and selects documents within the same semantic cluster. In another embodiment, if one or more ML models have been (partially) trained, the Engagement Application 235 uses these models to select documents. At block 340, while the selected document(s) are being provided and/or presented to the test audience, the Engagement Application 235 monitors the engagement of the users.

Based on this engagement, at block 345, the Engagement Application 235 refines one or more ML models to better select documents that are able to enhance or maintain the engagement of the audience. In one embodiment, this includes refining one or more weights associated with the ML model(s) to output a suggested lexical complexity, given the engagement and/or lexical knowledge of the audience. In some embodiments, the Engagement Application 235 refines the models to receive an indication of the user's lexical knowledge, and output a suggested complexity. To do so, the Engagement Application 235 can determine the complexity of the document(s) currently being presented, as well as the engagement of the audience. The Engagement Application 235 can then select or provide documents of a different complexity, and monitor the engagement change(s). By iteratively doing so, the Engagement Application 235 can determine how to modify the weights of the ML models to correlate lexical knowledge and complexity with engagement.

At block 350, the Engagement Application 235 determines whether the training is complete. In various embodiments, training may end because, for example, there are no additional test audiences, every document has been used, the models have reached a desired accuracy, and the like. If training has not completed, the method 300 returns to block 330, where the Engagement Application 235 determines the knowledge of the test audience anew (e.g., for a new set of users aiding in the training of the models). Otherwise, the method 300 continues to block 355, where the Engagement Application 235 returns/deploys the trained models for use in practice.

Figure 4:
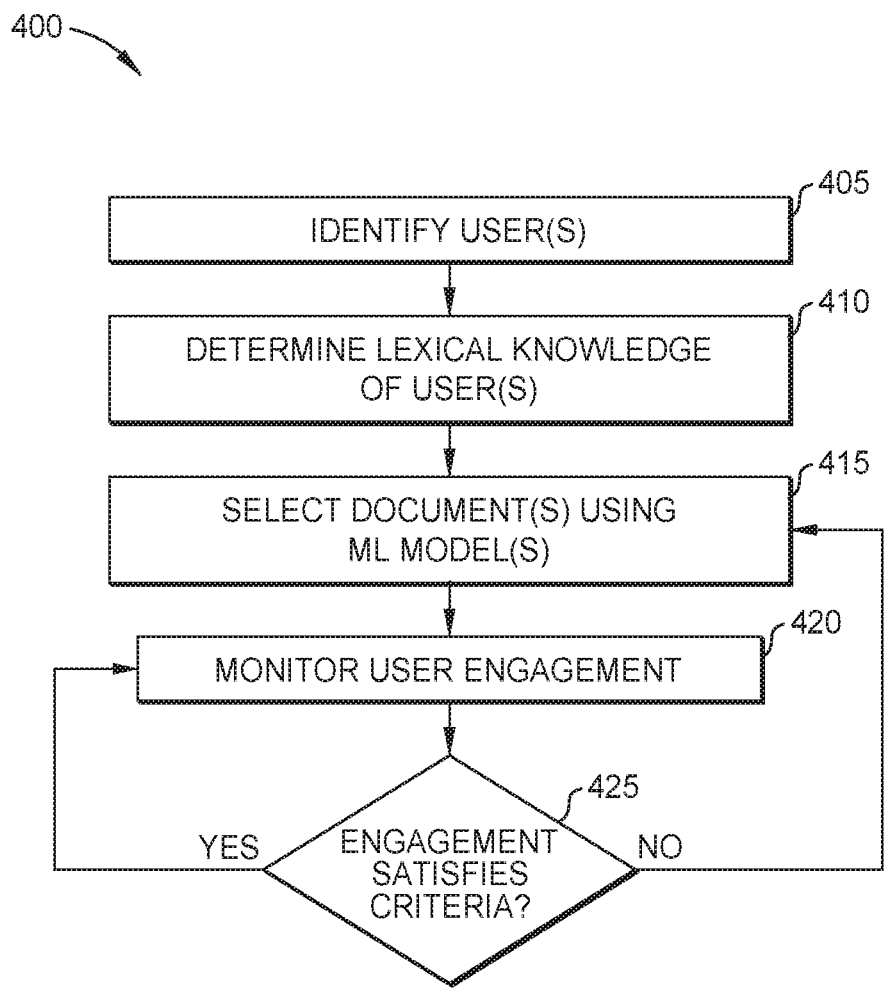
FIG. 4 is a flow diagram illustrating a method for using a trained machine learning model to recommend content based on lexical understanding and engagement, according to one embodiment disclosed herein.

FIG. 4 is a flow diagram illustrating a method 400 for using a trained machine learning model to recommend content based on lexical understanding and engagement, according to one embodiment disclosed herein. The method 400 begins at block 405, where the Engagement Application 235 identifies the target user(s) for whom documents are to be selected. In one embodiment, one or more of the users can identify themselves (e.g., by signing in), or the presenting user can indicate, to the Engagement Application 235, the identities of the audience users. In some embodiments, the Engagement Application 235 uses facial recognition, voice recognition, and the like to identify the target users in the audience. In some embodiments, the Engagement Application 235 also determines and/or receives an indication of the desired domain/topic.

The method 400 then proceeds to block 410, where the Engagement Application 235 determines the lexical knowledge of the identified user(s). In one embodiment, the Engagement Application 235 does so by retrieving user profiles associated with the users. At block 415, the Engagement Application 235 selects one or more documents for the users using the trained ML models. In one embodiment, the Engagement Application 235 does so by determining an aggregate knowledge (e.g., median or mean) of the users, and providing it as input to the model(s). In some embodiments, the ML model(s) output an indication of the recommended lexical complexity, and the Engagement Application 235 selects one or more documents tagged with the indicated complexity, from within the indicated domain or semantic cluster.

In various embodiments, the selected documents can then be provided to the users and/or to the presenter, in order to aid the presentation. At block 420, during this interactivity, the Engagement Application 235 monitors the engagement levels of the audience user(s) and/or the presenting user(s). As discussed above, the Engagement Application 235 may do so by monitoring biological data of the users, image and/or audio of the users, and the like. The method 400 then continues to block 425, where the Engagement Application 235 determines whether the current engagement of the user(s) satisfies predefined criteria. In one embodiment, the Engagement Application 235 first aggregates the engagement levels of each user to determine an overall engagement of the audience.

In an embodiment, the predefined criteria include a minimum threshold level of engagement. If the Engagement Application 235 determines that the current audience engagement satisfies this threshold, the method 400 returns to block 420 to continue monitoring the audience's engagement. That is, in one embodiment, the Engagement Application 235 refrains from taking any action until the user engagement falls below a defined threshold. If, however, the Engagement Application 235 determines that the user engagement is below the required threshold, the method 400 returns to block 415, where the Engagement Application 235 selects a new set of document(s) using the ML models. In this way, the Engagement Application 235 continuously monitors the user engagement in order to provide recommended content during the presentation.

Figure 5:
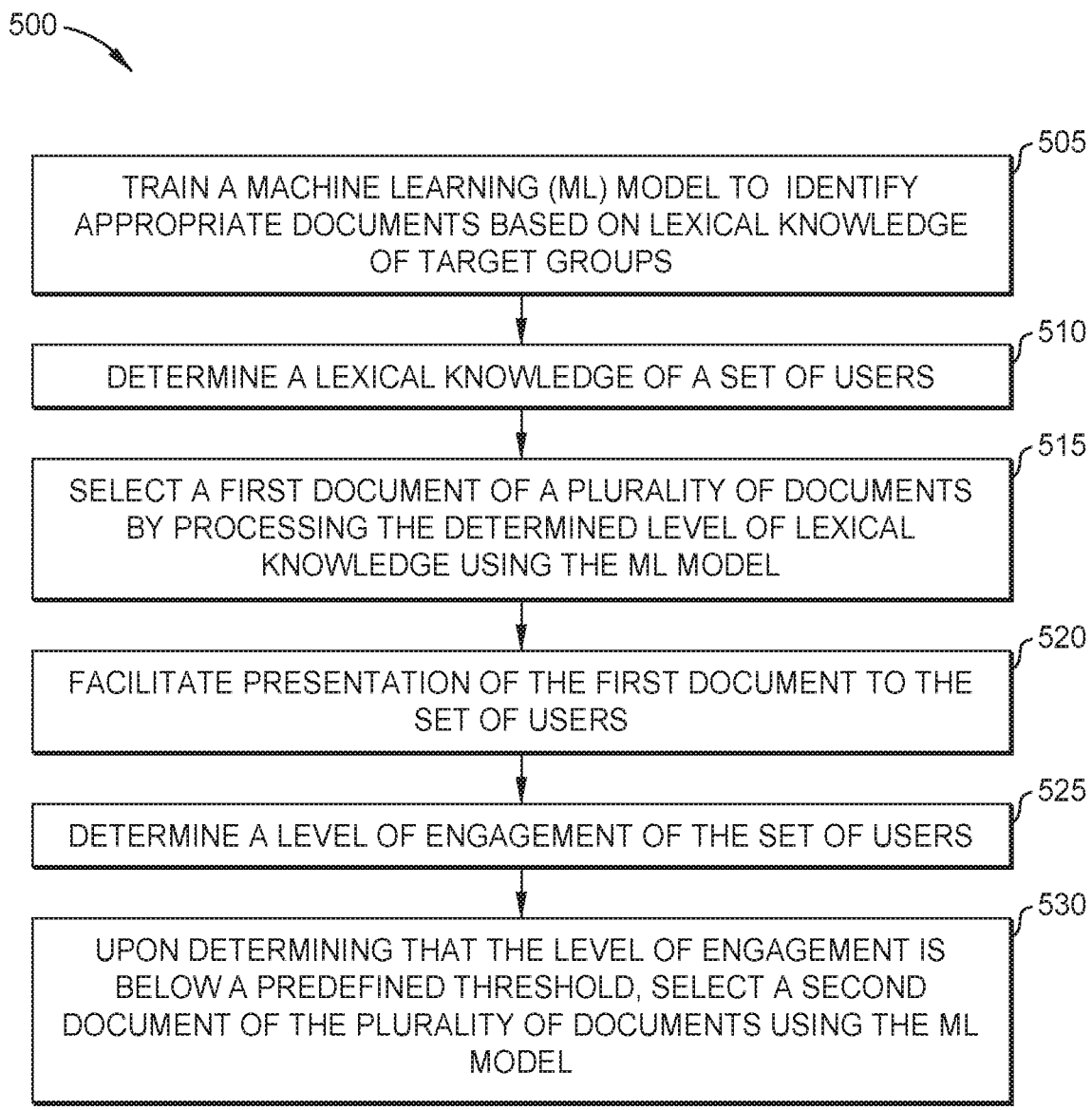
FIG. 5 is a flow diagram illustrating a method for using machine learning to evaluate lexical understanding, according to one embodiment disclosed herein.

FIG. 5 is a flow diagram illustrating a method 500 for using machine learning to evaluate lexical understanding, according to one embodiment disclosed herein. The method 500 begins at block 505 where an Engagement Application 235 trains a machine learning (ML) model to identify appropriate documents based on lexical knowledge of target groups. At block 510, the Engagement Application 235 determines a lexical knowledge of a set of users. The method 500 then continues to block 515, where the Engagement Application 235 selects a first document of a plurality of documents by processing the determined level of lexical knowledge using the ML model. Further, at block 520, the Engagement Application 235 facilitates presentation of the first document to the set of users. The method 500 proceeds to block 525, where the Engagement Application 235 determines a level of engagement of the set of users. At block 530, upon determining that the level of engagement is below a predefined threshold, the Engagement Application 235 selects a second document of the plurality of documents using the ML model.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and following, reference is made to embodiments presented in this disclosure. However, the scope of the present disclosure is not limited to specific described embodiments. Instead, any combination of the preceding and following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding and following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., an Engagement Application 235) or related data available in the cloud. For example, the Engagement Application 235 could execute on a computing system in the cloud and evaluate documents and user engagement. In such a case, the Engagement Application 235 could train and apply machine learning models, and store the models and tagged documents at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
training a machine learning (ML) model to identify appropriate documents based on lexical knowledge of target groups of users, comprising:
generating a test lexical complexity score by processing a level of lexical knowledge of a test audience using the ML model;
determining test engagement of the test audience based on one or more documents assigned the test lexical complexity score, from a corpus of documents; and
refining the ML model based on the test engagement of the test audience in response to the one or more documents, comprising modifying one or more weights of the ML model to correlate lexical knowledge and lexical complexity with user engagement;
determining a lexical knowledge of a set of users;
selecting a first document of a plurality of documents by processing the determined lexical knowledge using the ML model, comprising determining that the first document is tagged with a lexical complexity score that matches output of the ML model;
facilitating presentation of the first document to the set of users;
determining a level of engagement of the set of users, comprising:
capturing audio of the set of users during the presentation of the first document; and
determining, based on the audio, a frequency of questions, from the set of users, relating to the presentation; and
upon determining that the level of engagement is below a predefined threshold, selecting a second document of the plurality of documents using the ML model.

2. The method of claim 1, wherein selecting the first document of the plurality of documents comprises:
providing the determined lexical knowledge as input to the ML model;
receiving, from the ML model, a recommendation of lexical complexity for the set of users;
identifying a subset of the plurality of documents that corresponds to the recommended lexical complexity; and
retrieving one or more of the subset of the plurality of documents that correspond to a determined topic.

3. The method of claim 1, wherein training the ML model further comprises:
receiving the corpus of documents, wherein the corpus of documents includes documents relating to a plurality of domains;
clustering documents in the corpus of documents based on semantic similarity; and
categorizing each respective document in a first cluster based on a corresponding lexical complexity.

4. The method of claim 3, wherein categorizing each respective document in the first cluster based on the corresponding lexical complexity comprises:
identifying one or more rare words that appear relatively more frequently in the first cluster, as compared to the corpus of documents; and
for each respective document in the first cluster:
determining a respective frequency of the one or more rare words in the respective document; and
assigning a lexical complexity score to the respective document based on the respective frequency.

5. The method of claim 4, wherein training the ML model further comprises:
determining the level of lexical knowledge of the test audience;

selecting a first set of documents having a first lexical complexity score from the first cluster;
facilitating a first presentation of the first set of documents to the test audience;
determining a first level of engagement of the test audience during the first presentation;
selecting a second set of documents having a second lexical complexity score from the first cluster;
facilitating a second presentation of the second set of documents to the test audience;
determining a second level of engagement of the test audience during the second presentation; and
training the ML model based on (i) the determined level of lexical knowledge of the test audience, (ii) the first lexical complexity score, the (iii) the first level of engagement of the test audience, (iv) the second lexical complexity score, and (v) the second level of engagement of the test audience.

6. The method of claim 1, wherein determining the lexical knowledge of the set of users comprises:
determining a respective lexical knowledge of each respective user in the set of users; and
aggregating the respective lexical knowledges.

7. The method of claim 1, wherein determining the level of engagement of the set of users further comprises:
monitoring the audio for sounds indicating low engagement with the presentation;
capturing a first image of the set of users during the presentation of the first document; and
performing image analysis on the first image to determine whether the set of users appear engaged or disengaged with the presentation of the first document.

8. A computer-readable storage medium containing computer program code that, when executed by operation of one or more computer processors, performs an operation comprising:
training a machine learning (ML) model to identify appropriate documents based on lexical knowledge of target groups of users, comprising:
generating a test lexical complexity score by processing a level of lexical knowledge of a test audience using the ML model;
determining test engagement of the test audience based on one or more documents assigned the test lexical complexity score, from a corpus of documents; and
refining the ML model based on the test engagement of the test audience in response to the one or more documents, comprising modifying one or more weights of the ML model to correlate lexical knowledge and lexical complexity with user engagement;
determining a lexical knowledge of a set of users;
selecting a first document of a plurality of documents by processing the determined lexical knowledge using the ML model, comprising determining that the first document is tagged with a lexical complexity score that matches output of the ML model;
facilitating presentation of the first document to the set of users;
determining a level of engagement of the set of users, comprising:
capturing audio of the set of users during the presentation of the first document; and
determining, based on the audio, a frequency of questions, from the set of users, relating to the presentation; and
upon determining that the level of engagement is below a predefined threshold, selecting a second document of the plurality of documents using the ML model.

9. The computer-readable storage medium of claim 8, wherein selecting the first document of the plurality of documents comprises:
providing the determined lexical knowledge as input to the ML model;
receiving, from the ML model, a recommendation of lexical complexity for the set of users;
identifying a subset of the plurality of documents that corresponds to the recommended lexical complexity; and
retrieving one or more of the subset of the plurality of documents that correspond to a determined topic.

10. The computer-readable storage medium of claim 8, wherein training the ML model further comprises:
receiving the corpus of documents, wherein the corpus of documents includes documents relating to a plurality of domains;
clustering documents in the corpus of documents based on semantic similarity; and
categorizing each respective document in a first cluster based on a corresponding lexical complexity.

11. The computer-readable storage medium of claim 10, wherein categorizing each respective document in the first cluster based on the corresponding lexical complexity comprises:
identifying one or more rare words that appear relatively more frequently in the first cluster, as compared to the corpus of documents; and
for each respective document in the first cluster:
determining a respective frequency of the one or more rare words in the respective document; and
assigning a lexical complexity score to the respective document based on the respective frequency.

12. The computer-readable storage medium of claim 11, wherein training the ML model further comprises:
determining a level of lexical knowledge of a test audience;
selecting a first set of documents having a first lexical complexity score from the first cluster;
facilitating a first presentation of the first set of documents to the test audience;
determining a first level of engagement of the test audience during the first presentation;
selecting a second set of documents having a second lexical complexity score from the first cluster;
facilitating a second presentation of the second set of documents to the test audience;
determining a second level of engagement of the test audience during the second presentation; and
training the ML model based on (i) the determined level of lexical knowledge of the test audience, (ii) the first lexical complexity score, the (iii) the first level of engagement of the test audience, (iv) the second lexical complexity score, and (v) the second level of engagement of the test audience.

13. The computer-readable storage medium of claim 8, wherein determining the lexical knowledge of the set of users comprises:
determining a respective lexical knowledge of each respective user in the set of users; and
aggregating the respective lexical knowledges.

14. The computer-readable storage medium of claim 8, wherein determining the level of engagement of the set of users further comprises:

monitoring the audio for sounds indicating low engagement with the presentation;
capturing a first image of the set of users during the presentation of the first document; and
performing image analysis on the first image to determine whether the set of users appear engaged or disengaged with the presentation of the first document.

15. A system comprising:
one or more computer processors; and
a memory containing a program which when executed by the one or more computer processors performs an operation, the operation comprising:
   training a machine learning (ML) model to identify appropriate documents based on lexical knowledge of target groups of users, comprising:
      generating a test lexical complexity score by processing a level of lexical knowledge of a test audience using the ML model;
      determining test engagement of the test audience based on one or more documents assigned the test lexical complexity score, from a corpus of documents; and
      refining the ML model based on the test engagement of the test audience in response to the one or more documents, comprising modifying one or more weights of the ML model to correlate lexical knowledge and lexical complexity with user engagement;
   determining a lexical knowledge of a set of users;
   selecting a first document of a plurality of documents by processing the determined lexical knowledge using the ML model, comprising determining that the first document is tagged with a lexical complexity score that matches output of the ML model;
   facilitating presentation of the first document to the set of users;
   determining a level of engagement of the set of users, comprising:
      capturing audio of the set of users during the presentation of the first document; and
      determining, based on the audio, a frequency of questions, from the set of users, relating to the presentation; and
   upon determining that the level of engagement is below a predefined threshold, selecting a second document of the plurality of documents using the ML model.

16. The system of claim 15, wherein selecting the first document of the plurality of documents comprises:
providing the determined lexical knowledge as input to the ML model;
receiving, from the ML model, a recommendation of lexical complexity for the set of users;
identifying a subset of the plurality of documents that corresponds to the recommended lexical complexity; and
retrieving one or more of the subset of the plurality of documents that correspond to a determined topic.

17. The system of claim 15, wherein training the ML model further comprises:
receiving the corpus of documents, wherein the corpus of documents includes documents relating to a plurality of domains;
clustering documents in the corpus of documents based on semantic similarity; and
categorizing each respective document in a first cluster based on a corresponding lexical complexity, comprising:
   identifying one or more rare words that appear relatively more frequently in the first cluster, as compared to the corpus of documents; and
   for each respective document in the first cluster:
      determining a respective frequency of the one or more rare words in the respective document; and
      assigning a lexical complexity score to the respective document based on the respective frequency.

18. The system of claim 17, wherein training the ML model further comprises:
determining a level of lexical knowledge of a test audience;
selecting a first set of documents having a first lexical complexity score from the first cluster;
facilitating a first presentation of the first set of documents to the test audience;
determining a first level of engagement of the test audience during the first presentation;
selecting a second set of documents having a second lexical complexity score from the first cluster;
facilitating a second presentation of the second set of documents to the test audience;
determining a second level of engagement of the test audience during the second presentation; and
training the ML model based on (i) the determined level of lexical knowledge of the test audience, (ii) the first lexical complexity score, the (iii) the first level of engagement of the test audience, (iv) the second lexical complexity score, and (v) the second level of engagement of the test audience.

19. The system of claim 15, wherein determining the lexical knowledge of the set of users comprises:
determining a respective lexical knowledge of each respective user in the set of users; and
aggregating the respective lexical knowledges.

20. The system of claim 15, wherein determining the level of engagement of the set of users comprises:
monitoring the audio for sounds indicating low engagement with the presentation;
capturing a first image of the set of users during the presentation of the first document; and
performing image analysis on the first image to determine whether the set of users appear engaged or disengaged with the presentation of the first document.

\* \* \* \* \*